United States Patent Office

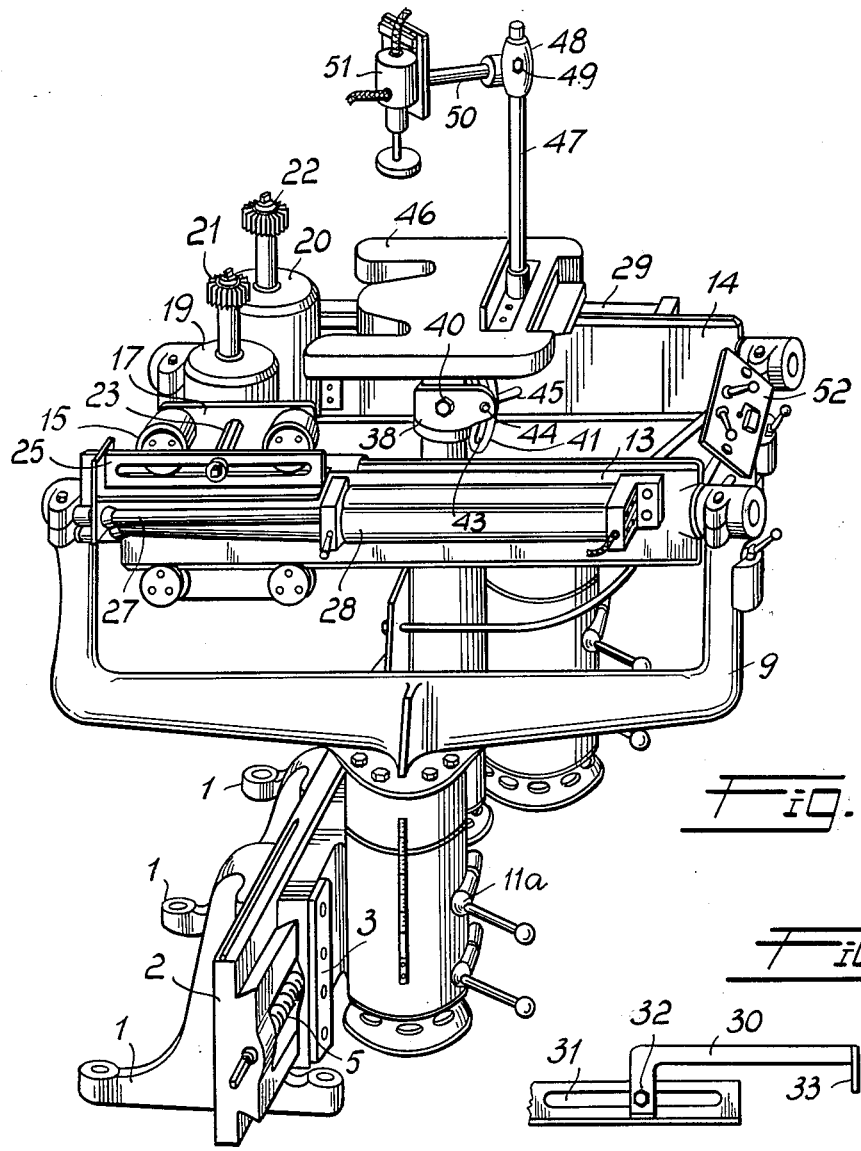

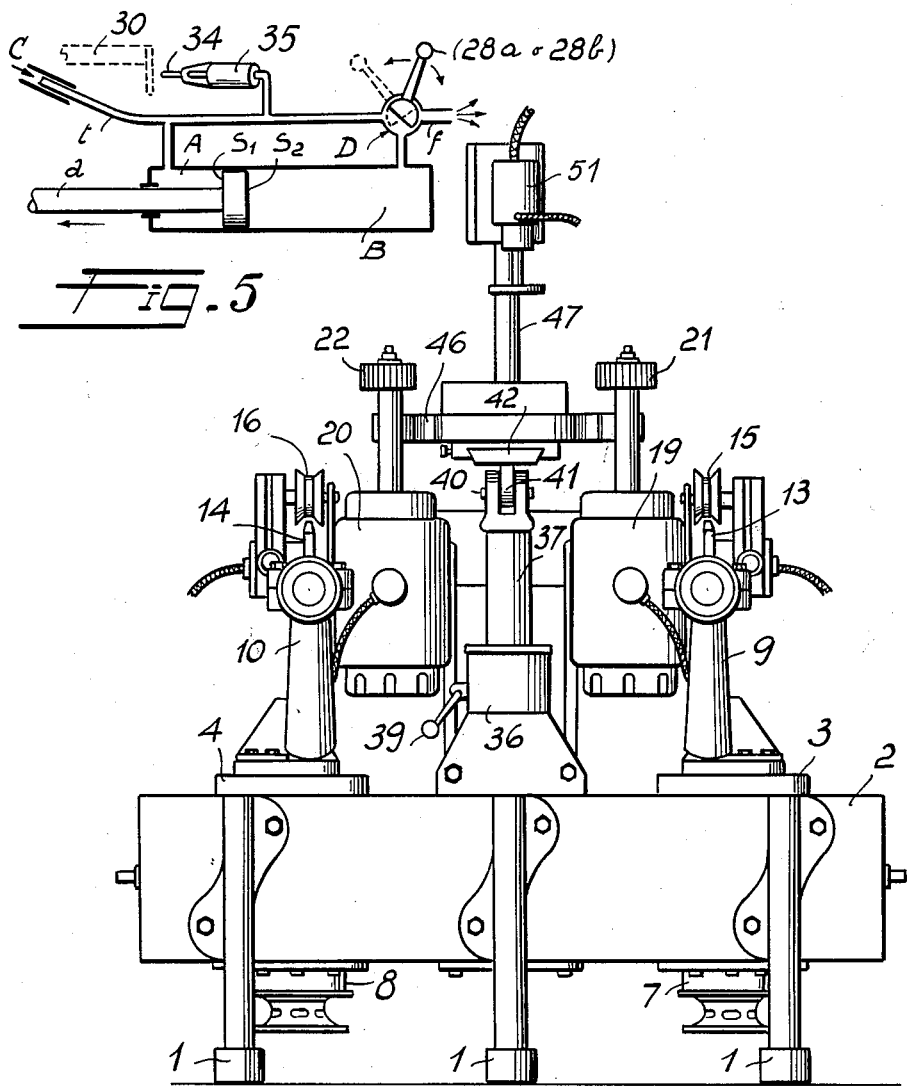

3,155,005
Patented Nov. 3, 1964

3,155,005
ROTARY HEAD MACHINE TOOLS
Antonio Guerra, Genoa, Italy (% Dr. Guido Modiano, Via Meravigli 16, Milan, Italy)
Filed Sept. 17, 1962, Ser. No. 223,944
Claims priority, application Italy, Nov. 11, 1961, 660,495
6 Claims. (Cl. 90—15)

This invention relates to machine tools such as multiple head milling machines.

Various machine tools are presently used embodying for the most part a limited number of adjustments of the work piece relative to the tool. In general, both the work table and the tool head are displaceable only along two main directions, i.e. vertically and horizontally.

Such well known milling machine types are inconvenient at times because of the limitation of possible working directions.

Another drawback incidental to the well known milling machine types resides in the fact that one single tool is provided. In fact, when symmetrical milling works are involved, this enforces the necessity of repeating the milling on both symmetrical sides at subsequent times with the consequence of time losses and inaccuracy possibilities.

It is the object of this invention to obviate the above outlined inconveniences occurring in the well known milling machines by providing a multiple milling machine suitable to do the milling job in whatever direction on the workpiece.

Another object of the invention is to include two tools in order to ensure a simultaneous milling of symmetrically shaped workpieces with the result of a considerable time saving and excellent milling accuracy.

A further object of the invention is to include control attachments suitable to facilitate and speed up all operations as needed during the operating stage.

These and still other objects are reached by a multiple roary head milling machine according to this invention, which comprises a frame with a baseplate, substantially horizontal guiding means on said baseplate, at least a slide mounted on said guiding means, a first individual column on said slide, supporting means on said first column, rails on said supporting means, said rails extending in a crosswise direction with respect to said first column, at least a slide on said rails, at least a cutting head mounted on said slide, at least a second column, on said base plate means connected to said second column for axially and rotationally controlling said second column, a platform on said second column, and means for clamping the work piece, on said platform.

A multiple head milling machine embodying the invention will now be described by way of example with reference to the accompany drawings, in which:

FIG. 1 is a perspective view of the multiple milling machine;

FIG. 2 shows a detail side view of a limit control device;

FIG. 3 and 4 are side views of the multiple milling machine; and

FIG. 5 is a layout of pneumatic equipment.

Figure 3:
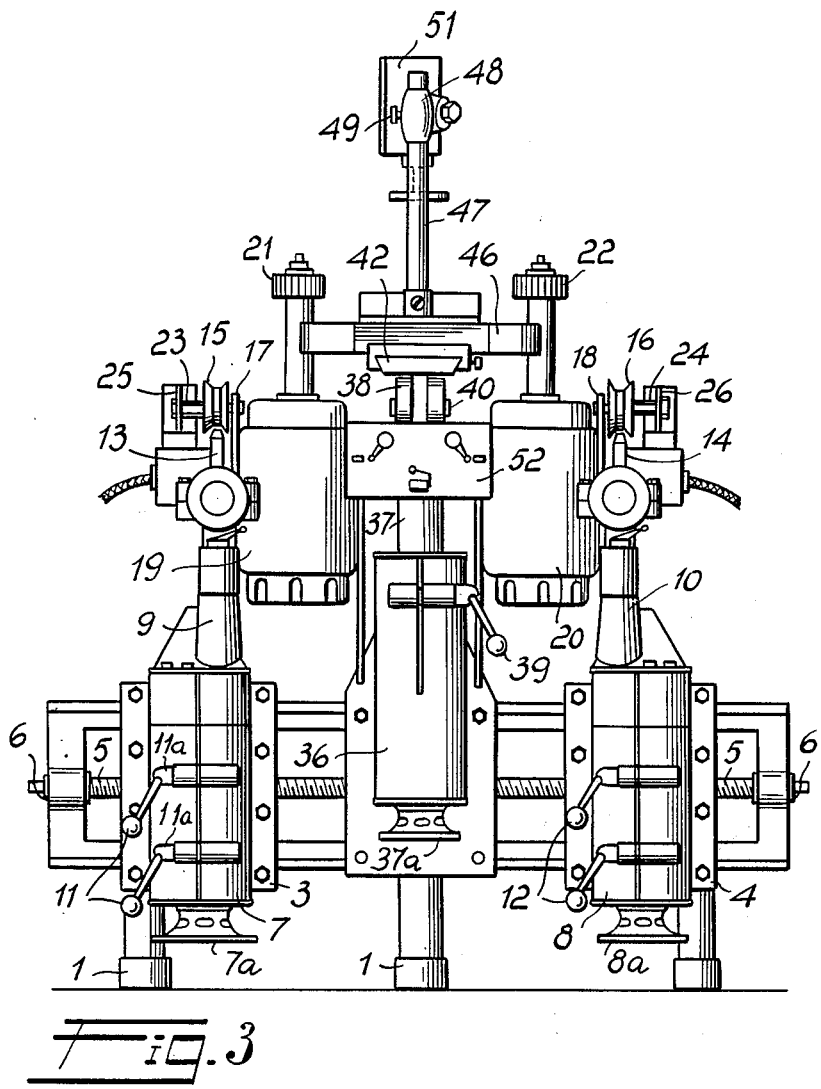

With reference to the above figures, the multiple milling machine comprises a baseplate 1 having a dove-tailed face 2 over which slides 3 and 4 can move horizontally. Slides 3 and 4 can be displaced sideways by rotation of a threaded shaft 5 in bearings 6. Fast with the slide 3 and 4 are vertically cylindrical columns 7 and 8, respectively, in which are journaled shafts terminating at their upper ends with forks 9 and 10. These forks 9 and 10 can slide and turn in columns 7 and 8 and can be controlled by means of knobs 11 and 12 and handwheels 7a and 8a. The forks 9 and 10 support horizontal upwardly directed prismatic rails 13 and 14 over which can slide bushes 15 and 16 fast with plates 17 and 18. The latter support the milling assemblies 19 and 20 having the respective cutters 21 and 22 at the top with vertically arranged rotation axes. The cross slides, constituted by the plates 17 and 18 and rollers 15 and 16 are fast through pins 23 and 24 with T-shaped iron-sections 25 and 26 which are in turn fast with shanks 27 of double acting cylinders 28 and 29, mounted on the rails 13 and 14.

The slides are further connected to rods 30 which are displaceable along slots 31 in the sections 25 and 26 (FIGURE 2). Such rods can be fastened to the above sections by means of the bolts 32 and end on the opposite side view a small plate 33 (FIGURE 2) adapted to engage with a pivot 34 of a limit control device 35. Between the milling assemblies 19 and 20 is a column fast with the baseplate and comprises a vertical cylindrical pillar 36 inside which can rotate and translate a shaft 37 having the upper part bifurcated to a fork 38, shaft 37 being either displaced or fastened at will by means of knob 39 and handwheel 37a.

The levers or knobs 11 are connected with threaded spindles 11a, and project transversely therefrom. The spindles 11a cooperate with internally threaded bosses 11b, which are rigid with the split cylinder case 7, so that a collar grip and bolt type locking device is provided thereby, which locks in position the shaft portion of fork 9 sliding within the cylinder 7. When the collar grip locking device is loosened the shaft of fork 9 may be pushed vertically by actuating the hand wheel 7a which is connected with the concerned shaft through screw-jack means. The same cooperation exists between the parts 36, 37, 37a, 39 and 8, 8a, 10, 12.

Fork 38 is provided with a transverse pin 40 on which is pivoted a vertical plate 41 which is in turn fast with a dovetailed surface 42; plate 41 has a circle arc shaped window 43 engaged with a pin 44 fast with fork 38; the connecting arrangement can be locked by means of a wing nut 45.

Over the dove-tailed surface 42 slides a work table or platform 46 adapted to receive the workpiece in milling process; above such platform is a pin 47 on which can slide a coupling 48 which is locked by the bolt 49 and which is fast with an arm 50 projecting therefrom and extending above the platform 46. On such arm 50 is then fastened, at the free end, an attachment for clamping the workpiece.

The pneumatic equipment is illustrated on the layout given in FIGURE 5.

Cylinders 28 and 29 are, in effect, pneumatic jacks. Their arrangement is schematically the following: pipe $t$ permanently puts chamber A directly into communication with a compressed air source C whilst the chamber B is put into communication with the same compressed air source via valve D.

Supposing that both chambers are communicating with the source C at a pressure means D, that is with the switch arranged as in FIGURE 5, the jack piston will move in such a direction as to cause the rod $a$ to move out of the cylinder, that is in the direction as shown by the arrow.

Since $S_1 < S_2$ and pressure P is equal in both chambers A and B, there will be in terms of force:

$$f_1 = PS_1 < F_2 = PS_2'$$

that is $F_2$ (on the face $S_2$ of the piston) prevails over $F_1$ (relevant to face $S_1$).

When the valve D is brought to its rest position (as outlined by section-lining in the figure), the communication of the chamber B with the source C is excluded and the air contained in the chamber is simultaneously outgoing through a hole $f$. Under such conditions $F_1$ prevails over the positon $(S_1)$, and it will move in the opposite sense (that is contrary to the arrow).

The multiple milling machine is completed with a switchboard 52.

After the foregoing the performance of the multiple milling machine becomes clear and apparent.

By actuating the pins 6 the threaded shaft 5 is caused to rotate, so that it is possible to displace horizontally the milling assemblies 19 and 20 until reaching the desired position; by acting upon knobs 11 and 12 and handwheels 7a and 8a it is further possible to raise and rotate at will the forks 9 and 10. Thereby the milling assemblies and particularly the cutters 21 and 22 can be located in the most suitable position for starting work; a further displacement of the milling assemblies is obtainable through sliding over the rails 13 and 14 of the bushes 15 and 16; such displacement occurs by means of the double effect cylinders 28 and 29. The workpiece is arranged on the platform 46 and clamped thereon by the clamping device 51. The platform itself can be tilted as desired by means of the fulcrum pin pivot 40 and at the same time rotated around a vertical axis and raised or lowered by the shaft 37 which is movable within the cylinder body 36. Still another displacement of the platform 46 can be operated by sliding it over the surface 42.

The milling assembly 21 (or 22) carries out the operation by cutting in the workpiece which will be locked by the clamp 51 on the platform 46.

The limit device 35 (consisting of a relief valve) (see FIGURES 2 and 5) has the shank 34 placed under the action of the plate 33 under valve limit conditions.

As may be seen, the multiple milling machine offers the widest possibility in the displacement of both workpiece and milling assemblies.

The reciprocal tilting between the cutters and the workpiece can be therefore selected at will, so that there will be the possibility of a wide milling range.

The multiple milling machine is particularly advantageous in connection with cutting to be taken on symmetrical bodies (such as for example chair seats) since the provision of two milling assemblies ensures a simultaneous milling on two opposite sides of the workpiece. This enables a very accurate and quick milling with a consequent reduction of working times. The sliding of the milling assemblies over rails 13 and 14 can be automatically operated by means of the limit devices illustrated in FIGURE 2 whereby the return motion of said milling assemblies to their rest position can be controlled.

The so devised invention is subject to several changes and modifications without departing from the scope of the invention itself.

So for example the baseplate can be provided with suitable means to make the machine movable. The displacements can still for example be fully or partly controlled by hydropneumatical or mechanical type screw devices or the like. In practice materials and dimensions could be those as dictated by individual requirements.

I claim:
1. A rotary head machine tool, comprising a frame with a baseplate, substantially horizontal guiding means on said baseplate, a number of first slides mounted on said guiding means, a first individual column on each of first slides, supporting means on said first column, rails on said supporting means, said rails extending in a crosswise direction with respect to said first column, a second slide on said rails, a cutting head mounted on said second slide, another column, on said baseplate means connected to said other column for axially and rotationally controlling said other column, a platform on said other column, and means for clamping the workpiece on said platform.

2. A machine tool as claimed in claim 1, wherein from said platform a further column projects upwardly, a sleeve being fitted on said further column, said clamping means being connected to said sleeve, so as to project therefrom and extend above said platform.

3. A machine tool as claimed in claim 1, further including supporting means carried by said other column and defining an axis which extends along a transverse direction with respect to the axial direction of said other column, said platform being rotatably mounted on said supporting means, and locking means for locking said platform in a selected inclined position on said supporting means.

4. A machine as claimed in claim 1, wherein said first column is parallel to but offset from said other column, adjusting means being provided on said baseplate for supporting said first column so that its offset relation with respect to said other column may be adjusted.

5. A machine tool as claimed in claim 1, comprising fluid driving means connected with said frame and said second slide carrying said cutting head, limit valves being provided on said second rails for being actuated by said slide.

6. A machine as claimed in claim 1, wherein said guiding means on said baseplate are in the form of dovetailed guides, and wherein said platform is formed of two members, one of which is carried by said other column, and has dove-tailed surfaces, on which the other member is slidingly mounted.

References Cited in the file of this patent

UNITED STATES PATENTS

| | | |
|---|---|---|
| 253,974 | Campbell | Feb. 21, 1882 |
| 1,412,220 | Sampson | Apr. 11, 1922 |
| 1,517,073 | Kent | Nov. 25, 1924 |
| 2,091,450 | Miller | Aug. 31, 1937 |
| 2,204,946 | Parker | June 18, 1940 |
| 2,566,697 | Davies | Sept. 4, 1951 |

FOREIGN PATENTS

| | | |
|---|---|---|
| 1,110,499 | Germany | July 6, 1961 |